United States Patent Office 2,777,884
Patented Jan. 15, 1957

2,777,884

PROCESS FOR PRODUCING SODIUM ACETYLIDE AND IMPROVED SODIUM ACETYLIDE PRODUCT

Thomas F. Rutledge, Madison, and Alio J. Buselli, New Providence, N. J., assignors to Air Reduction Company, Incorporated, New York, N. Y., a corporation of New York No Drawing. Application November 9, 1953,
Serial No. 391,139

5 Claims. (Cl. 260—665)

This invention relates to the preparation of sodium acetylide, and has for its object the provision of an improved process for producing sodium acetylide, and sodium acetylide having improved chemical and physical properties.

The conventional production methods of reacting acetylene and sodium in liquid ammonia have objectionable features which are well known and which are due largely to the difficulty in handling liquid ammonia and to the formation of undesirable by-products. It has been proposed heretofore to react acetylene with a stirred mixture of sodium and xylene to produce sodium acetylide (German Patent 494,575). However, it has been found, as will appear hereinafter, that the yield of sodium acetylide according to this patent is so low as to be commercially impractical.

The invention provides an improved process of producing sodium acetylide rapidly and economically by reacting acetylene with a dispersion of sodium in an inert liquid medium under particular temperature and chemical conditions resulting in quantitative yields of sodium acetylide based on the conversion of sodium.

This invention is based mainly on our discovery that within a critical temperature range, sodium acetylide can be obtained efficiently and economically by reacting purified acetylene with finely divided particles of sodium dispersed in an inert liquid medium. Quite unexpectedly in view of the prior art, we found that the invention involves a critical upper temperature of reaction at about 110° C. The reaction with finely dispersed sodium takes place at temperatures below and above the melting point of sodium. Sodium in this dispersed form displays much of its great inherent activity. In general, the smaller the particle size of sodium, the greater its surface area in proportion to the weight of the material and the more intimate is the contact between the sodium particles and the acetylene resulting in high reaction efficiency in the critical temperature range.

Our invention is further based on our discovery that the commercial production of our improved sodium acetylide in good yield requires the maintenance of a chemical environment not heretofore appreciated or understood. The reaction of sodium while dispersed in an inert liquid with acetylene at a suitable temperature will produce the surprising results of our invention only by excluding from the reaction environment certain commonly occurring materials that act as poisons or anticatalysts. We have found that relatively small amounts of oxygen exercise an adverse effect on the reaction entirely disproportionate to its mass and that the oxygen content of the acetylene should be below about 0.3% by volume for effective results. Moreover, the acetylene should be dry and free of acetone, a material frequently found in commercial acetylene.

It is believed that the reaction of sodium and acetylene in an inert liquid medium which occurs in our process can be represented by the following equation:

(1)  $2Na + 2HC \equiv CH \rightarrow 2NaC \equiv CH + H_2$

The products are sodium acetylide and hydrogen. As the reaction temperature was increased above 110° C., the yield of sodium acetylide decreased materially. At these higher temperatures, instead of the substitution reaction indicated above, apparently reactions occur which result in unidentified sodio-organic compounds, with negligible yields of the desired sodium acetylide being formed. The critical temperature appears to vary with the particular type of liquid medium employed, and probably varies slightly even with media within a given class. When the novel process is conducted at a temperature sufficiently high to carry the reaction in Equation 1 to substantial completion and not in excess of about 110° C., reaction times of the order of one to four hours are found to be ample, in sharp contrast to the very lengthy reaction times described in the prior art, in some instances well over twenty-four hours.

In its more complete aspects the process of our invention comprises reacting a dispersion of sodium in a suitable inert liquid at a temperature below 110° C. with dry acetylene, preferably containing less than 0.3% by volume oxygen, preferably also free of acetone, producing sodium acetylide in quantitative yield based on sodium which can be better than about 99% pure, light in color, virtually white, and pulverulent. The temperature of about 110° C. is significant because it is the highest temperature at which the yield is at 100%. As the temperature increases thereabove, the yield and character of the product suffer, and when the temperature is increased to about 160° C. the yield suffers very appreciably and may reach zero.

While the following examples will serve to illustrate the invention more fully, they are not to be construed as limiting the scope of the invention:

The sodium acetylide was prepared in a suitable vessel equipped with a mechanical stirrer for vigorous agitation, a thermometer, an acetylene inlet, and a gas outlet. A water-cooled reflux condenser surrounded the portion of the gas outlet immediately adjacent the vessel, and the exit end of the outlet was connected to a dry ice trap, isopropanol-cooled. The unreacted acetylene gas and any resulting hydrogen were then conducted in a tube from the trap to a sensitive thermal conductivity cell which was calibrated for mixtures of hydrogen and acetylene content of the acetylene off-gas. The hydrogen analyzer thus furnished a reliable means of following the course of the reaction, and more importantly a rapid means for determining the approximate speed of the reaction. Further, in all the examples, the reactions were conducted at atmospheric pressure.

In each example, the extent of the reaction in forming sodium acetylide was determined by treating the reaction mixture with dimethyl sulfate at 90° to 140° C. in stoichiometric quantities, the methylacetylene (propyne) product being collected in a Dry Ice trap. In the reaction of dimethyl sulfate and sodium acetylide prepared in accordance with this invention, both methyl groups are utilized quantitatively as will be described more fully hereinafter.

Example I

A sodium dispersion was prepared, comprising xylene and sodium (particle size 10 to 25 microns) in equal parts by weight, and stabilized with 0.25% aluminum stearate. 0.25 mol of this finely dispersed sodium metal was stirred in 300 milliliters (ml.) of xylene, and agitation was started. The resulting mixture was heated to about 100° C., and then acetylene was introduced, without stopping the agitation. After 2½ hours, the hydrogen analyzer indicated that the hydrogen evolution had stopped, and the reaction was deemed completed. The xylene and unreacted acetylene were removed by two equally effective means, (a) by vacuum pumping and (b) by purging with nitrogen gas, and subsequently cooled to 90° C. Dimethyl sulfate (0.125 mol) was continuously added for about 30 minutes. An exothermic reaction occurred, and the temperature rose evenly to about 110° C. The temperature was gradually raised to 140° C., and after a total reaction time of 2½ hours, the reaction was stopped. The yield of sodium acetylide, as determined by analysis of the methylacetylene product, was 99+ percent based on sodium. Acetylene content of the condensed methylacetylene amounted to about 1% to 3%, as determined by infrared spectographic analysis.

*Example II*

Using the same reactants as in Example I for preparing sodium acetylide, the reaction was conducted at 130–135° C. (boiling range of xylene used was 137–142° C.) for three hours. Sodium acetylide yield was determined as described hereinabove, and corresponded to 7.3 mol percent based on sodium.

The above examples demonstrate conclusively that there exists a critical operating temperature above which yield of desired sodium acetylide drops very sharply.

*Example III*

A series of experiments was conducted in a medium comprising di-n-butyl carbitol, and in substantially the same manner and involving the same reactants as in the previous examples. The results are tabulated below, the sodium acetylide yield based on sodium:

| Reaction Temp., ° C. | Reaction Time (hours) | Sodium Acetylide Yield (Percent) |
| --- | --- | --- |
| 60–70 | 2½ | 100 |
| 90–100 | 1 | 100 |
| 100–110 | ¾ | 100 |
| 130 | 3⅓ | 59 |
| 160–165 | 3 | 32 |

Thus with di-n-butyl carbitol as the reaction medium, quantitative yields of sodium acetylide were obtained in a range of 0 to 110° C., and the reaction proceeded more rapidly at a given temperature (e. g. 100–110° C.) than the same reaction in a xylene medium. Except for variations in temperature, the results are substantially the same for any type of relatively inert medium employed.

Since reaction time is of prime importance in commercial operations, the optimum temperature chosen for conducting the process will be one that is below the critical temperature at which the sodium acetylide yield drops considerably, and one at which the reaction proceeds rapidly.

The reaction zone should be substantially free of any material which would have any detrimental effect on the reaction between sodium and acetylene or on the sodium acetylide product. Acetylene as prepared commercially from calcium carbide contains substances which would interfere with the sodium-acetylene reaction, such as phosphines, arsines, amines, and certain sulfur compounds (vinyl sulfide). When such acetylene is intended for use in the present invention, it is preferably desiccated and purified, for example, by means of absorption towers packed with Drierite (anhydrous calcium sulfate of W. A. Hammond Drierite Co.). In addition to the removal of contained moisture by drying, it is important to reduce the oxygen content, usually derived from air, to the lowest practical amount, and this can be accomplished effectively by bleeding the apparatus to reduce the oxygen content. Acetone is another poison affecting the yield of sodium acetylide, and its removal is accomplished by passing the acetylene over activated alumina which also removes water and sulfur-phosphorous compounds. The acetylene may be tested for acetone by passing the gas through a test solution of 2,4-dinitrophenylhydrazine.

The liquid medium in which the sodium is dispersed must be relatively inert with respect to sodium, acetylene, or sodium acetylide. Suitable liquid media include aromatic hydrocarbons (xylene), dialkyl ethers (n-butyl ether), dialkyl ethers of glycols or polyglycols (di-n-butyl carbitol), dioxane, mesitylene, tetraethoxypropane and aliphatic hydrocarbons (kerosene). Generally, the desired liquid media have boiling points which are relatively high and which are above the reaction temperatures of this invention. However, toluene can be used under suitable pressure.

Suitable dispersing and stabilizing agents (such as stearate or oleic acid) may be added to finely divided sodium dispersions in the liquid media, for the purpose of preventing the agglomeration of sodium particles at room temperatures as well as the reaction temperatures. However, if the finely divided sodium is reacted as soon as it is produced, stabilizing agents for the dispersion are not important. Agents containing any substances (such as peroxides) which would interfere with the process should be avoided.

Further experiments indicated that optimum results are obtained when the sodium particle size is less than about 400 microns during the reaction period, the preferred range of size being between 5 and 100 microns. In general, the use of a relatively small sodium particle during the reaction period results in two advantages: (1) the percentage yield of sodium acetylide based on conversion of sodium is increased; and (2) the time of reaction period is decreased. However, even bulk sodium may be employed originally if during the reaction period, the sodium particle size is decreased to less than about 400 microns. Vigorous agitation of the sodium in the inert medium may provide the preferred size of sodium particles during the reaction period. High speed stirrers which provide a shearing type agitation, such as homogenizers, are especially suitable for such a purpose; and the use of these stirrers or equivalent devices eliminates the need of dispersing agents. We have found that the aging of the sodium dispersion has a pronounced effect on the reaction. The freshly prepared dispersion is more effective than an aged dispersion, which seem to become deactivated.

The solid sodium acetylide is usually removed from the inert liquid by filtering. It is important to remove the inert liquid to the lowest amount practical, and it is preferable to select a liquid that is most easily removed. The residual adsorbed liquid can be removed by vacuum pumping at a suitable temperature, by purging with an inert gas such as argon or nitrogen, or purging with acetylene at a temperature of around 125° C. Xylene is difficult to remove, while n-butyl ether, dioxane, m-decane, and tetraethoxypropane are more easily removed. For example, dioxane may be removed by purging at from 70° to 80° C. at a vacuum of about 10 mm. of mercury, while xylene can be removed at around 65° C. under a vacuum of 1 mm.

The sodium acetylide produced by the process of this invention can be virtually white, finely divided, free-flowing powder, preferably less than 5 microns in diameter, which can be wetted by inert liquids without undesirable coalescence of the particles. Other characteristics include high thermal and storage stabilities. The dry compound may be prepared so as to contain not more than about one percent of impurities, for example, less than one percent of either or both sodium hydroxide and sodium carbonate. The sodium acetylide may be exposed to the atmosphere without spontaneous ignition, and it may be stored for relatively long periods in dry air or inert gases such as argon, nitrogen, and acetylene.

The sodium acetylide obtained in accordance with this invention has been found to be exceptionally active, for reasons not yet clearly understood. An outstanding application of the sodium acetylide of this invention is in its reaction with certain compounds, especially with dimethyl sulfate to produce methylacetylene, as expressed in Equation 2:

(2)
$$C_2HNa + \tfrac{1}{2}(CH_3)_2SO_4 \rightarrow \tfrac{1}{2}Na_2SO_4 + CH_3-C\equiv CH$$

The prior art discloses that only one of the methyl groups reacts ordinarily, but in this reaction both methyl groups are utilized, so that quantitative yields of methylacetylene are obtained based on sodium acetylide.

The sodium acetylide of this invention was used very successfully in the preparation of acetylenic alcohols, as expressed by the following equations:

(3)
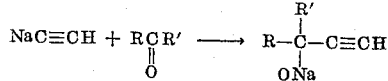

(4)
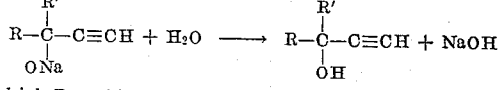

in which R and R' are alkyl groups.

As shown in Equation 3, sodium acetylide reacts with ketone to produce the sodium salt of the acetylenic alcohol; and, as shown in Equation 4, such salt was decomposed by water to form sodium hydroxide and the alcohol. The following examples illustrate the preparation of two specific acetylenic alcohols, but are not to be construed as limiting the scope of the invention thereto.

*Example IV*

Sodium acetylide was prepared as described generally in Example I, except that the sodium was dispersed in kerosene which is also a relatively inert high-boiling medium. When the preparation of the sodium acetylide in the vessel had been completed, acetone was added slowly to the vessel accompanied by continuous stirring. Such addition was completed in one hour; and the temperature of the reaction zone in such period rose from 21° C. to 37.5° C. The mixture was then stirred for an additional three hours, after which time the temperature was 26° C. (no external heating or cooling means were used during or after the addition of acetone). The mixture was decomposed with water; and then it was neutralized with carbon dioxide, after which more water was added. Sodium carbonate was filtered off, and the resulting mixture was dried and fractionated at atmospheric temperature. The actual yield of 3-methyl-1-butyn-3-ol amounted to approximately 65% of the theretical yield.

*Example V*

Sodium acetylide was prepared as described in Example I. Methyl ethyl ketone was added slowly to the reaction for about 70 minutes, the temperature being maintained between 1° C. and 12° C. The mixture was then continuously stirred for about two and one-half hours. The mixture was decomposed, and neutralized with carbon dioxide. Sodium carbonate was filtered off, and the resulting mixture was dried and fractionated at atmospheric temperature. The actual yield of 3-methyl-1-pentyn-3-ol was approximately 87% of the theoretical yield; and the conversion of methyl ethyl ketone to such acetylenic alcohol was about 80%.

*Example VI*

Sodium acetylide was prepared from sodium and acetylene in a xylene medium at 100° C. 108° C. Diethylsulfate (one equivalent) was then added slowly; the reaction temperature ranged between 90° C. and 140° C.; and the resulting 1-butyne (ethylacetylene) was condensed in a trap. While a quantitative yield was obtained, about 1.4 ethyl group of the diethyl sulfate reagent entered into the reaction under the conditions described, as expressed by the following equation:

(5)
$$C_2HNa + (C_2H_5)_2SO_4 \rightarrow NaC_2H_5SO_4 + C_2H_5-C\equiv CH$$

Sodium acetylide and diethyl sulfate reacted to produce sodium ethyl sulfate and 1-butyne.

While the preceding examples have disclosed that the sodium acetylide product of this invention is reacted with dimethyl sulfate and diethyl sulfate specifically to produce methylacetylene and ethylacetylene respectively, it will be understood that the sodium acetylide may be reacted with a sulfate ester broadly to produce an alkyl acetylene. Similarly, while the preceding examples have disclosed that the sodium acetylide product is reacted with acetone and methyl ketone specifically to produce 3-methyl-1-butyn-3-ol and 3-methyl-1-pentyn-3-ol, respectively, it will also be understood that the sodium acetylide may be reacted with a ketone broadly to produce a tertiary acetylenic alcohol.

Chemical analysis (potassium iodomercurate titration), distillation, and infrared spectral data were used to establish the purity of the methylacetylene product. In the previous examples, it was determined that the methylacetylene was about 99+% pure.

It is evident that utilization of the present invention makes possible the production of sodium acetylide in satisfactory yields and at relatively low cost. The equipment is very simple; the conditions required in the process are not extreme; the use of an inert liquid medium having a relatively high boiling point is largely free of the disadvantages realized with the use of conventional media (such as ammonia); and the process is rapid and efficient. Since the process is conducted at atmospheric pressure and the liquid media have relatively high boiling points, there is no need of compressors, recycling and refrigerating units, required by some conventional processes for prepairing sodium acetylide. Further, from the standpoint of safety, the process of the invention is safer to conduct than are the conventional processes involving potentially hazardous media, such as ammonia. The inert liquid medium of this process is easily recovered and reused. The production of the following classes of compounds is economical for practically the same reasons as those given for the production of sodium acetylide-acetylenic alcohols and alkyl acetylenes (such as methylacetylene). Generally the same apparatus and liquid media are used for the production of sodium acetylide, acetylenic alcohols, and alkyl acetylenes.

While the specific embodiments of the invention have been described in connection with a batch type operation, it will be understood that equally good results may be obtained when the invention is carried out in a continuous operation. It will also be understood that the invention is not limited to the specific examples described herein, but may be practiced in other ways without departing from the spirit and scope of the invention as defined by the following claims.

This application is a continuation-in-part of our application Serial No. 323,697, filed December 2, 1952, now abandoned.

We claim:

1. A process for producing mono-sodium acetylide which comprises reacting acetylene in a high state of purity, practically free of acetone, and finely divided sodium particles dispersed in a liquid medium inert with respect to said reactants and products of reaction, and conducting the reaction at a temperature of from about 60° C. to about 110° C. to obtain substantially quantitative yields of mono-sodium acetylide based on conversion of said sodium, said mono-sodium acetylide being of high purity, virtually white, and in a pulverulent state.

2. A process in accordance with claim 1 in which said acetylene is dry and has an oxygen content less than 0.3% by volume.

3. A process in accordance with claim 1 in which the particles of dispersed sodium are preponderantly less than 25 microns in diameter.

4. A process in accordance with claim 1 in which the slurry of finely divided sodium, acetylene and inert liquid medium is effectively agitated during the reaction period, and the reaction is conducted at atmospheric pressure.

5. The process for producing mono-sodium acetylide which comprises reacting commercial acetylene and a dispersion of finely divided sodium, the particles of which are preponderantly less than 25 microns in liquid medium inert with respect to said reactants and products of reaction, said acetylene being practically free of acetone and having an oxygen content of less than 0.3% by volume, effectively agitating the slurry of said sodium, acetylene, and inert liquid medium during the reaction period, and conducting the reaction at a temperature below about 110° C. and at atmospheric pressure according to the reaction

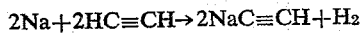

the yield of mono-sodium acetylide being substantially quantitative on the basis of sodium conversion.

References Cited in the file of this patent

UNITED STATES PATENTS

| | | |
|---|---|---|
| 2,125,384 | Macallum | Aug. 2, 1938 |
| 2,200,941 | Vogt | May 14, 1940 |
| 2,605,295 | Garner et al. | July 29, 1952 |
| 2,716,662 | Cohen et al. | Aug. 30, 1955 |

FOREIGN PATENTS

| | | |
|---|---|---|
| 494,575 | Germany | Mar. 28, 1930 |

OTHER REFERENCES

"Handling Sodium in Organic Reactions," Hansley, Ind. and Eng. Chem., vol 43, No. 8, August 1951, pages 1759 to 1766.